United States Patent
Klinger et al.

[11] 3,821,893
[45] July 2, 1974

[54] TESTING APPARATUS AND RESPECTIVE CONTROL CIRCUIT

[75] Inventors: Friedrich Klinger, Darmstadt-Arheilgen; Rolf Ross, Darmstadt, both of Germany

[73] Assignee: Firma Carl Schenck Maschinenfabrik GmbH, Darmstadt, Germany

[22] Filed: Apr. 3, 1973

[21] Appl. No.: 347,462

[30] Foreign Application Priority Data
Apr. 13, 1972 Germany............................ 2217702

[52] U.S. Cl..................................... 73/118, 73/71.7
[51] Int. Cl. ........................................... G01m 17/04
[58] Field of Search............................. 73/118, 71.7

[56] References Cited
UNITED STATES PATENTS
3,718,033    2/1973    Petersen ............................. 73/71.7

*Primary Examiner*—Jerry W. Myracle
*Attorney, Agent, or Firm*—W. G. Fasse; W. W. Roberts

[57] ABSTRACT

The invention relates to testing apparatus and respective control circuit means, especially for testing samples including movable elements such as vehicular axles with the respective wheels wherein load applying means, such as piston cylinder means are arranged to apply loads to a load application point of the test sample whereby the load applying means are controlled by error compensated control values. The rated displacement value or the actual displacement value of a first load applying means is supplied as a compensation or correction value to the control circuit means of one or more load applying means through a computer which calculates the correction or compensation value as a function of a curve which represents the displacement of the load application point and which displacement depends on the geometric configuration or structure of the sample to be tested.

15 Claims, 7 Drawing Figures

TESTING APPARATUS AND RESPECTIVE CONTROL CIRCUIT

BACKGROUND OF THE INVENTION

The present invention relates to a testing apparatus and to respective control circuit means for testing samples including movable elements. More specifically, the invention relates to testing equipment, especially hydraulically driven testing equipment including load applying means, preferably hydraulic piston cylinder arrangements, for applying time variable forces to a load application point of a test sample in different directions which extend especially perpendicularly to each other. The present apparatus is suitable for testing samples including movable elements such as motor vehicle axles with their rotatable wheels.

This type of equipment may be used for testing any random test samples having movable elements. However, such equipment is best known in connection with the testing of motor vehicle axles. For this type of test it is necessary to simulate the forces which are effective upon the vehicle during its actual use on the road. Thus, the testing equipment produces loads corresponding to the forces resulting from the unevenness of the road surface as well as loads corresponding to the acceleration forces, the braking forces, and the lateral forces effective on the vehicle wheel. It should, however, be mentioned that not only vehicle axles but also vehicle chassis and entire vehicles may be subjected to a load test on such testing equipment.

In the actual operation of a vehicle, the forces effective on the vehicle are applied to the point of contact between the vehicle wheel and the road surface. Accordingly, the forces applied by a testing apparatus should also be effective in a load application point corresponding to the point of contact between the vehicle wheel and the road surface. In the following test such point will be referred to as the load application point or simply "point." The forces applied to said point may be analyzed as three components. The unevenness of the road surface will be effective in the vertical direction. Acceleration and deceleration forces or rather braking forces will be effective in directions extending in the direction of vehicular movement. Lateral forces will occur, especially when the vehicle negotiates a curve. Such lateral forces are effective in a direction extending perpendicularly to the direction of vehicular movement and create bending load conditions. The just mentioned three load conditions may be produced or simulated by means of three load devices arranged in three directions extending perpendicularly to each other and comprising, for example, hydraulic piston cylinder arrangements. The axle to be tested is secured to the testing apparatus at points at which the axle is normally connected to the vehicle chassis.

The loads or shocks resulting from the unevenness of a road surface are produced by displacement controlled load means. The load devices for applying the braking and acceleration forces, as well as the lateral forces are controlled in response to force. It has been found in connection with the just described testing equipment that the actual load conditions applied to the vehicle wheel do not correspond to the rated load values. Rather, it has been found that forces occur which cannot be controlled quickly enough whereby control errors occur which interfere with the normal sequence of a testing program and which falsify the testing result in such a manner that frequently a precise evaluation is not possible.

OBJECTS OF THE INVENTION

In view of the foregoing, it is the aim of the invention to achieve the following objects singly or in combination:

to overcome the drawbacks of the prior art, more specifically to provide a testing control circuit arrangement which will avoid the above mentioned control errors as well as the falsification of the testing result;

to provide a control circuit arrangement for a testing apparatus which will ascertain the causes of said drawbacks, especially of the control errors and of the falsification of the test result in order to compensate for these causes;

to control load application means in such a manner that the load application point is prevented from rotating when the brake is released so that no unintentional torque moment which could cause load errors may be effective on the axle when the brake is not effective;

to switch the load means from displacement responsive control to force responsive control by means of switches, preferably in the form of electronic switches, whereby the changeover from one type of control to the other should preferably take place in response to the actuation of the vehicle brake of the vehicle the axle of which is being tested;

to avoid that the type or shape of the vehicle tire may influence the testing result, preferably by replacing the vehicle wheel by a lever journaled to the vehicle axle whereby the testing forces or loads are applied to the free end of said lever corresponding to the load application point and whereby the load application to the sample to be tested is simplified;

to supply one or more rated or actual displacement representing values derived from one or more load application means to a computer which computes displacement or force correction values in response to the geometric dimensions or configurations of the sample to be tested whereupon such computed correction values are supplied to the respective displacement or force control means in addition to the displacement or force values;

to supply to a computer in connection with the testing or entire vehicle axles not only the rated displacement values or the actual displacement values derived from one vehicle wheel or rather derived from one load application point but rather to also apply the respective values derived from the other side of the vehicle or from the other point whereby the computation will include such other rated or actual displacement values so that the correction values will be based on both pairs of values;

to switch over the piston cylinder arrangement producing the braking forces from displacement responsive control to force responsive control whereby such switching over is to take place in response to the application of the vehicle brake; and to store the values representing actual displacement at the instant of the switching over whereby said correction values are computed as a function of the motion curve of said point which curve is determined by said stored actual displacement values.

SUMMARY OF THE INVENTION

The above objects have been achieved according to the invention in a testing control apparatus wherein a rated displacement value or an actual displacement value derived from first load means is supplied as a correction value through a computer to the control circuit of one or more displacement or force controlled load means such as further hydraulic piston cylinder means whereby said computer calculates the correction value in response to the motion curve of said point which curve depends upon the geometric configuration of the sample to be tested.

The control arrangement according to the invention has the advantage that the rated force values or the rated displacement values are corrected in a testing apparatus for vehicle axles in response to the vertical displacement of the load application point in such a manner that the desired force or the desired displacement is accomplished in said point by applying said corrected values to the load application means for producing the braking and/or the accelerating force as well as to the load application means for producing the lateral force.

The present invention is especially suitable for testing vehicle axles wherein a load means which is effective in parallel to the longitudinal axis of the vehicle applies braking or acceleration forces whereas a vertically arranged load means produces or simulates the shocks resulting from the unevenness of the road surface and wherein a third load means is arranged perpendicularly to the two just mentioned load means for applying lateral forces. In an apparatus as just described, it is advantageous to operate the load means which is effective in parallel to the longitudinal axis of the vehicle as a displacement controlled means when the vehicle brake is not effective whereby the load application point of the vehicle wheel is maintained perpendicularly below the center of the wheel axle to be texted. However, when the vehicle brake is actuated the load means effective in parallel to the longitudinal vehicle axis, that is in parallel to the vehicle advance should be operated as force controlled means whereby the braking load is controlled by the braking force.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

In the following text the load values representing a force will be designated by "F," load values representing displacement will be designated by "S." The indices "$x, y, z$" designate the directional component of a load value. The index "$s$" designates a rated load value. The index "$i$" designates an actual, measured load value. The index "$k$" designates a corrected or compensation value. Control values are designated as "$St$" plus the respective directional index.

Figure 1:
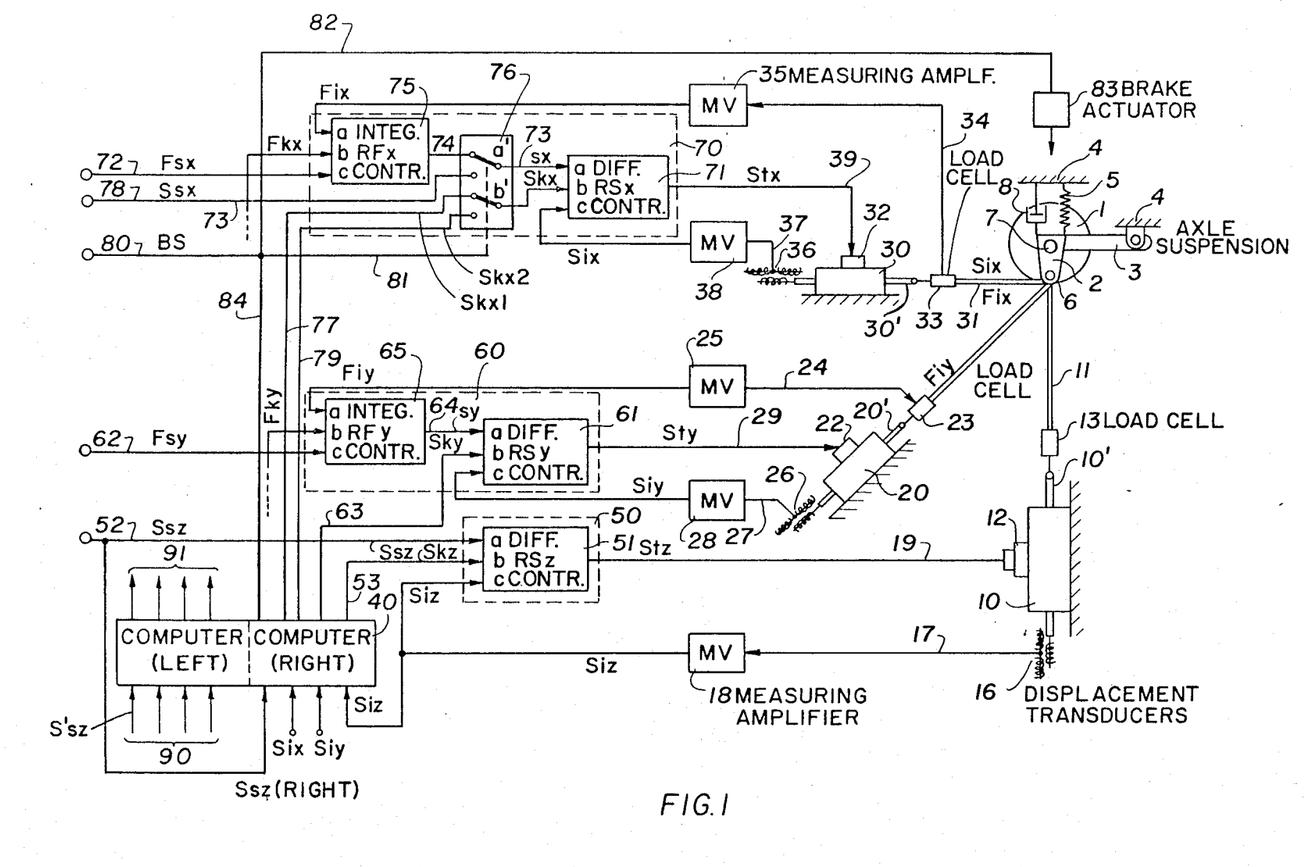
FIG. 1 illustrates the control circuit arrangement and the load application means for producing the braking forces, the lateral forces and the shocks resulting from the unevenness of the road surface for one vehicle wheel.

The vehicle wheel 1 is simulated by a lever 2 which is journaled to the wheel axle 7. The lever 2 represents at its free end a load application point 6 which is spaced from the axle 7 by spacing corresponding to the radius of the tire. The wheel supporting arrangement is, just as in the vehicle itself, attached to the frame structure 4 of the testing equipment by means of a connecting or guide rod 3. Further, the vehicle wheel 1 is supported by spring means 5 and shock absorbing means 8 in the same manner as in the vehicle itself.

Push rods 11, 21, and 31 are connected to the load application point 6. These push rods are actuated by force application means 10, 20 and 30 comprising for example, piston cylinder arrangements which are controlled by means of servo valves 12, 22 and 32. The push rod 11 of the cylinder 10 is arranged to extend vertically. The vertical direction will be referred to as the z-direction in the following text. The piston cylinder arrangement 10, 10' simulates the shocks resulting from the unevenness of the road surface. This load device 10 is controlled in response to displacement. A load cell 13 which is arranged between the piston rod 10' and the push rod 11 is merely shown for illustration purposes, but the measured forces are not evaluated in the shown example. It is to be understood that such forces may readily be evaluated, if desired.

A further load cell 23 which is arranged between the piston rod 20' of the cylinder 20 and the push rod 21 is connected by the conductor 24 to a measuring amplifier 25. The load cell 33 of the cylinder 30 which is arranged between the piston rod 30' and the push rod 31 is connected through the conductor 34 to the measuring amplifier 35. The displacement $S_{iz}$ of the piston rod 10' of the cylinder 10 is measured by means of a displacement transducer 16 which is connected through the conductor 17 to the measuring amplifier 18. The displacements of the other piston rods are similarly ascertained. Thus, the displacement transducer 26 of the cylinder 20 is connected by the conductor 27 to the measuring amplifier 28 and the displacement transducer 36 of the cylinder 30 is connected by the conductor 37 to the measuring amplifier 38.

The actual displacement value $S_{iz}$ which is measured by the displacement transducer 16 is supplied through the measuring amplifier 18 to the correction value computer 40 as well as to the control means 50 for the cylinder 10. The control means 50 comprises, for example, a displacement control member RSz 51 for the z-component. The computer 40 will be described in more detail below. The displacement rated value component $S_{sz}$ is applied to the input "a" of the control member 51 which is a proportional differential amplifier (PD controller). Said displacement rated value $S_{sz}$ is provided through a programming device not shown but connected to the input terminal 52. The programming device may, for example, be a conventional noise or function generator or it may be a programming automat as described in U. S. Pat. No. 3,187,565 (Heinz Kreisdorte et al., June 8, 1965). The input terminal 52 is further connected to a respective input of the correction value computer 40 whereby the latter also receives the displacement rated value S$sz$ for the z-component. The correction value computer 40 supplies a displacement correction or compensation value s$kz$ to the input "$b$" of the control member 51 through the conductor 53 if this correction value is required in any particular test sequence. The control member 51 produces a control signal S$tz$ in response to the difference between the rated displacement value S$sz$ and the actual measured displacement value S$iz$ whereby simultaneously the displacement correction value S$kz$ is taken into account. The control signal S$tz$ is supplied to the servo valve 12 through the conductor 19. Thus, hydraulic piston cylinder arrangement 10 now adjusts a displacement value S$iz$ corresponding to the rates displacement value S$sz$. This adjusted displacement value is applied or transmitted to the load application point 6 by means of the push rod 11.

The load piston cylinder arrangement 20 for producing the lateral force is arranged horizontally and it extends in a direction perpendicularly to the plane defined by the vehicle wheel. The direction in which the push rod 21 of piston cylinder arrangement 20 is effective will be referred to as the y-direction. The displacement transducer 26 ascertains an actual displacement value S$iy$ which is supplied to the input "$c$" of the displacement control member RS$y$ 61 via the measuring amplifier 28. The control member 61 is arranged within the control means 60 for the y-component. The correction computer 40 further supplies a displacement correction value S$ky$ through the conductor 63 to the input "$b$" of the displacement control member 61. A rated value s$y$ is supplied to the input "$a$" of the displacement control member 61 by the force control member RF$y$ 65 which is arranged in the control means 60 and in which is connected to said input "$a$" of the displacement control member 61 by the conductor 64. The displacement control member 61 produces a control signal S$ty$ as a function of the difference between the rated value s$y$ and the actual displacement value S$iy$ whereby the displacement correction value S$ky$ is also taken into account. The control signal S$ty$ is supplied to the servo valve 22 through the conductor 29.

The input "$c$" of the force control member 65 is connected to the input terminal 62 for receiving a rated force value F$sy$. Further, the input "$a$" of the force control member 65 receives the actual force value F$iy$ which is measured by the load cell 23 and which is produced by the push rod 21 of the piston cylinder arrangement 20. This value F$iy$ corresponds to the load actually applied to the point 6 and is supplied to said input "$a$" of the force control member 65 through the measuring amplifier 25. If desired, a force correction value F$ky$ may also be applied to the control member 65 at its input "$c$" for example in response to the actuation of the vehicle brake. For this purpose, the correction value computer 40 is connected to the force control member 65 as shown in FIG. 1. The force control member 65 produces a rated value S$y$ which is supplied through the conductor 64 to the displacement control member 61. The force control member 65 has an integrating operating characteristic. The difference between the actual force value F$iy$ and the rated force value F$sy$ is ascertained and the rated value s$y$ is produced as a function of said difference and if applicable in accordance with said force correction value F$ky$. The output signal s$y$ of the control member 65 is supplied to the control member 61 which produces, as mentioned, the control signal S$ty$ by means of which the piston cylinder arrangement 20 is adjusted in such a manner that the force applied by the push rod 21 corresponds to the rated force value F$sy$. The actual displacement value S$iy$ may be supplied to the correction value computer 40 at the respective input as shown in FIG. 1. The actual conductor between the input S$iy$ and the output of the measuring amplifier 28 is not shown in FIG. 1 for simplicity's sake but it would be similar to that shown for S$iz$.

The third piston cylinder arrangement 30 is arranged to be effective horizontally and in parallel to the longitudinal axis of the vehicle for producing braking and acceleration forces. The just described direction in which the piston cylinder arrangement 30 is effective will be referred to as the x-component. According to the invention the piston cylinder arrangement 30 shall maintain the load application point 6 vertically below the center of the wheel axle 7 as long as the vehicle brake is released. Therefore, according to the invention the piston cylinder arrangement 30 is operated as a displacement controlled arrangement as well as a force controlled arrangement. The actual displacement value S$ix$ is measured by the displacement transducer 36 and is applied to the input "$c$" of the displacement control member R$sx$ 71 through the measuring amplifier 38. The displacement control member 71 is arranged within the control means 70. The force applied by the piston cylinder arrangement 30 to the point 6 is ascertained by the load cell 33 and applied as an actual force value F$ix$ to the input "$a$" of the force control member RF$x$ 75 through the measuring amplifier 35.

The force control member 75 further receives at its input "$c$" a rated force value F$sx$ from the input terminal 72. In addition, a force correction value F$kx$ may be applied by the correction computer 40 to the input "$b$" of the force control member 75 as shown by the respective conductor in FIG. 1. The control member 75 has an integrating characteristic. Hence, the difference between the actual force value F$ix$ and the rated force value F$sx$ is integrated to produce at the output 74 a rated value s$x$. This rated value s$x$ is applied to the input "$a$" of the displacement control member 71 through contact $a'$ of switching means 76 shown symbolically as mechanical switching means which, however, in actual practice will preferably be electronic switching means. The input "$b$" of the displacement control member 71 is connected through contact $b'$ of the switching means 76 and through the conductor 77 to the correction computer 40 for receiving the displacement correction value S$kx1$. The displacement control member 71 produces a control signal S$tx$ as a function of the difference between the rated value s$x$ and the actual displacement value S$ix$ whereby the correction value S$kx$ is taken into account. The control signal S$tx$ is applied to the servo valve 32 through the conductor 39 in order to adjust the servo valve 32 in such a manner that the rated force value F$sx$ is accomplished.

It should be mentioned here that in the shown position of the contacts $a'$ and $b'$ of the selector switch 76, which as mentioned, may be an electronic switch, the control means 70 operate as a force controller whereby the cylinder 30 is employed as a force controlled cylinder. The selector switch 76 has a control input connected by a conductor 81 to an input terminal 80 to which is applied a braking signal BS whereby the selector switch 76 is switched into the shown position. The braking signal BS is also supplied through the conductor 82 to a brake actuator 83 which applies the respective brake force in response to the actuation of the vehicle brake not shown. The brake signal input terminal 80 is also connected to the correction computer 40 through conductor 84. The actual displacement value S$iz$ or the rated displacement value SS$z$ has been stored in the correction computer 40 in response to actuation of the vehicle brake. The correction computer 40 computes a function or curve which represents the displacement or movement of the point 6 in dependency of said stored value S$iz$ or S$sz$ which will be explained in more detail below with reference to FIG. 3. A further signal will be supplied through the input terminal 80 in response to the release of the brake. This brake release signal is supplied to the brake actuator 83, to the selector switch 76 and to the correction value computer 40. The selector switch 76 switches the contacts $a'$ and $b'$ to their opposite position (not shown) whereby the conductor 73 is connected to the input terminal 78 for receiving a rated displacement value S$sx$ which generally has the value zero when the point 6 is to be maintained below the wheel axle 7. A further correction value S$kx2$ is supplied by the computer 40 through the conductor 79 in response to a displacement of the wheel axle as a result of a movement of the guide link 3 whereby such wheel axle displacement is taken into account. This second correction value S$kx2$ is supplied to the input "b" of the displacement control member 71 when the switch contact $b'$ of the switch 76 is in the position opposite to that shown.

If necessary, the actual displacement value S$ix$ may be supplied to a respective input terminal of the correction computer 40 as indicated in FIG. 1. However, the actual connection between the input S$ix$ of the correction computer 40 and the measuring amplifier 38 is not shown in FIG. 1 for simplicity's sake. Further it should be noted that in FIG. 1, also for simplicity's sake, only the control means for one end of an axle are illustrated. The control means for the other end of the axle will have the same identical elements as shown in FIG. 1. Thus, the actual and rated displacement values derived from the other end of the axle may be applied to input terminals 90 of the correction computer 40 which produces at its output terminals 91 the respective correction values. The correction computer takes into account the influences between the axle ends in accordance with certain coupling factors as will be explained below with reference to FIG. 5.

Figure 2:
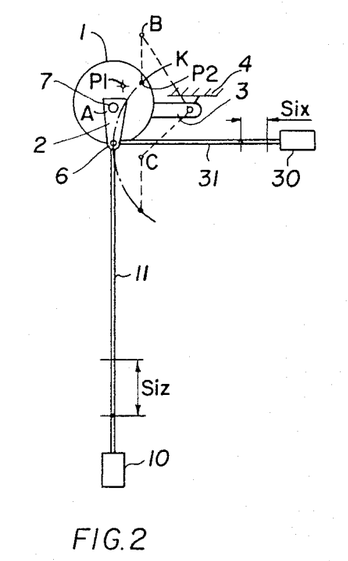
FIGS. 2 and 3 illustrate the displacement curve of the load application point corresponding for example to the point of contact between the vehicle wheel and the road surface, whereby the vehicle brake is ineffective in FIG. 2 and actuated and thus effective in FIG. 3.
Figures 3, 4:
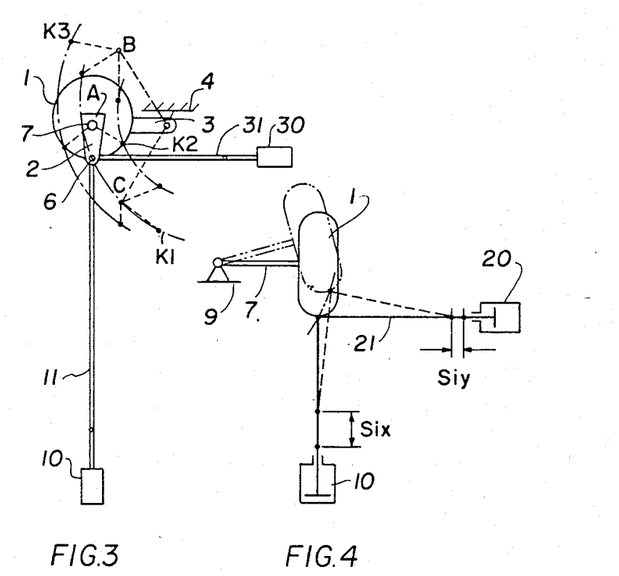
FIG. 4 shows in a schematic manner the displacement of a vehicle wheel attached to a jointed cross-shaft axle.

FIGS. 2 and 3 illustrate the pivotable connection of the vehicle wheel 1 or rather of the wheel simulating lever 2 to the frame 4 of the testing apparatus by way of the guide link 3. The frame 4 may also be the vehicle frame. The push rods 11 and 31 of the cylinders 10 and 30 are operatively connected to the load application point 6. The cylinder 20 which is effective in the y-direction is not shown in FIGS. 2 and 3.

FIG. 2 illustrates the present apparatus with the brake in its released condition that is the lever 2 may rotate without restraint about the wheel axle 7 extending at this time through the point A. If the push rod 11 is displaced by the displacement S$iz$, the load application point 6 will not remain below the wheel axle 7. After the displacement corresponding to S$iz$, the wheel axle 7 is located at the point B and the point 6 is shifted to P1. The correction computer 40 now produces a correction value S$kx2$ on the basis of the rated displacement value S$sz$ or on the basis of the actual displacement value S$iz$, and supplies the correction value S$kx2$ to the displacement control member 71. The correction value S$sx2$ causes a displacement change of the piston 31 corresponding to the value S$ix$. The point 6 is now shifted to P2 whereby point 6 is again below the vehicle axle 7 which is still in the point B. The correction value S$kx2$ is computed by the correction computer 40 on the basis of the characteristic of the curve K which has a circular shape in the illustrated example of the wheel support. The relationships are somewhat different when the vehicle brake is actuated when the wheel axle 7 is in point A the lever 2 and the guide link 3 form a right angle and this right angle is maintained during the duration of the brake actuation provided that the vehicle brake can take up the programmed brake force. If this is the case, the load application point 6 will travel along the curve K1 as shown in FIG. 3.

On the other hand, if the vehicle brake is actuated when the wheel axle in point B, the lever 2 and the guide link 3 form an acute angle and the load application point 6 travels along the curve K2 shown in FIG. 3. When the whel axle 7 is in point C at the moment of the actuation of the vehicle brake, the lever 2 and the link 3 form an obtuse angle and the load application point 6 travels along the curve K3. Since the correction value for the displacement control of the cylinder 30 depends on the instantaneous position of the wheel axle 7 at the time of the actuation of the vehicle brake, the correction computer 40 stores the actual displacement value S$iz$ or the rated displacement value S$sz$ as described above with reference to FIG. 1, in response to the actuation of the brake and thus depending on the brake signal BS, whereby the correction signal and the correction curve is computed as a function of this stored value. It should be mentioned that in the shown embodiment the indication of the displacement component in the z-direction is sufficient for the computation of the correction curve because it is possible to compute the respective curve on the basis of this single value due to the known geometric dimensions of the vehicle chassis. If this should not be possible, it is necessary to store several measured or actual displacement values in the correction computer and to use these values for the computation of the correction curve.

FIG. 4 illustrates with reference to a jointed cross-shaft axle that it is necessary to also use a correction value for the cylinder 20 which is effective in the direction of the y-component. The vehicle wheel 1 is pivoted to a fixed point 9 by means of its jointed cross-shaft axle 7. If the wheel 1 is now vertically moved by a value S$iz$ the correction computer 40 must compute a correction value S$ky$ which in turn causes a displacement of the push rod 21 corresponding to the displacement value S$iy$.

It should be noted here, that in the illustrated embodiment of the invention of a testing apparatus for testing vehicle axles, the horizontally effective cylinders 20 and 30 do not influence each other at all or only rather slightly. These cylinders 10 and 20 also do not influence the vertically effective cylinder 10. Contrary thereto, the vertically effective cylinder 10 strongly influences the horizontal cylinders. This influence is compensated by the application of the displacement correction values S$ky$ as well as S$kx1$ and S$kx2$.

By controlling the cylinder 30 in response to displacement when the vehicle brake is released the turning away of the load application point 6 is prevented. This results in a so called rotating force application which has the important advantage that the application of the testing loads to the vehicle corresponds closely to the forces actually effective when the vehicle is on the road. Between the load application point 6 and the wheel axle 7 there is arranged a wheel bearing operating as a further joint or pivot about which the lever 2 may rotate. By way of this displacement control, it is possible not only to prevent the turning away of the lever, but also to achieve the advantage that no undesirable torque moment is applied to the axle which otherwise could result or be produced by control errors of the braking force applying cylinder. As mentioned, this so called rotating force or load application simulates substantially the actual forces effective on the rolling wheel.

Figure 5:
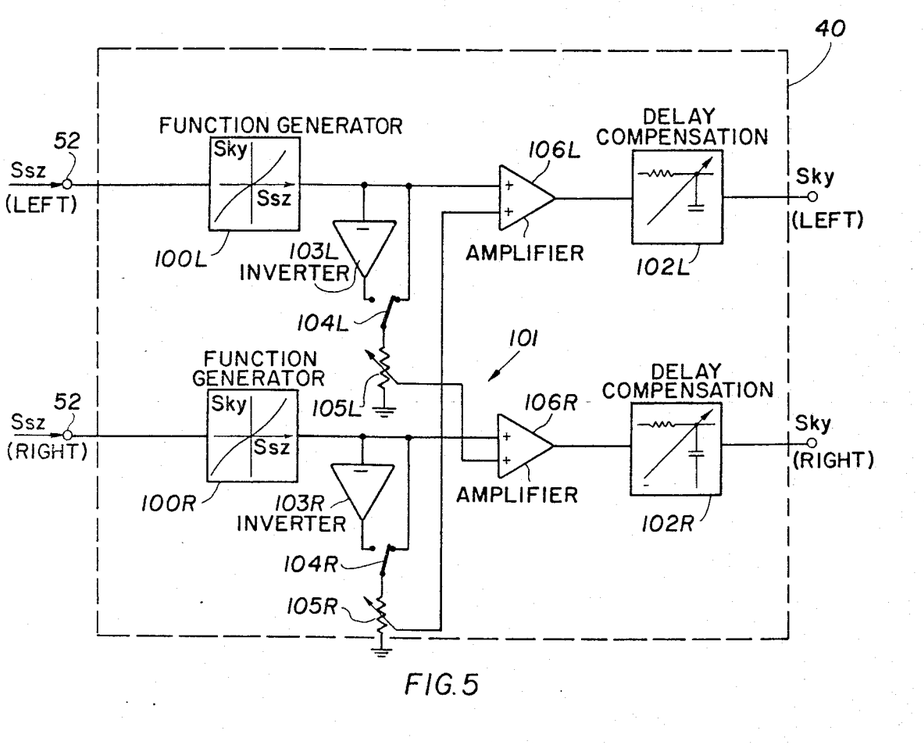
FIG. 5 illustrates a detail of a computer circuit shown as a block in FIG. 1.

FIG. 5 illustrates in a schematic manner the essential features of the computer 40 shown in block form in FIG. 1. The computer 40 has a left and a right section for the respective left and right wheel of an axle. The left and right input terminals 52 receive the rated displacement signal S$sz$, for example for the z-component. The arrangement for the other components is the same. Adjustable function generators 100L and 100R, for example, diode function generators are connected to their respective input terminal 52. These function generators store the rated values and are known as such. The output of each function generator 100L, 100R is connected through a coupling network 101 and through respective amplifiers as well as through time delay compensation circuits 102L, 102R to the outputs at which the correction values S$ky$ are provided.

The coupling network 101 with inverters 103L, 103R, switches 104L, 104R, potentiometers 105L, 105R and amplifiers 106L, 106R serves for compensating the mutual influences from one wheel to the other. Even if only one wheel is subjected to a load, for example, by a bump in the road, the other wheel will be effected thereby. The potentiometers 105L, 105R serve for correcting said mutual influences.

Figure 6:
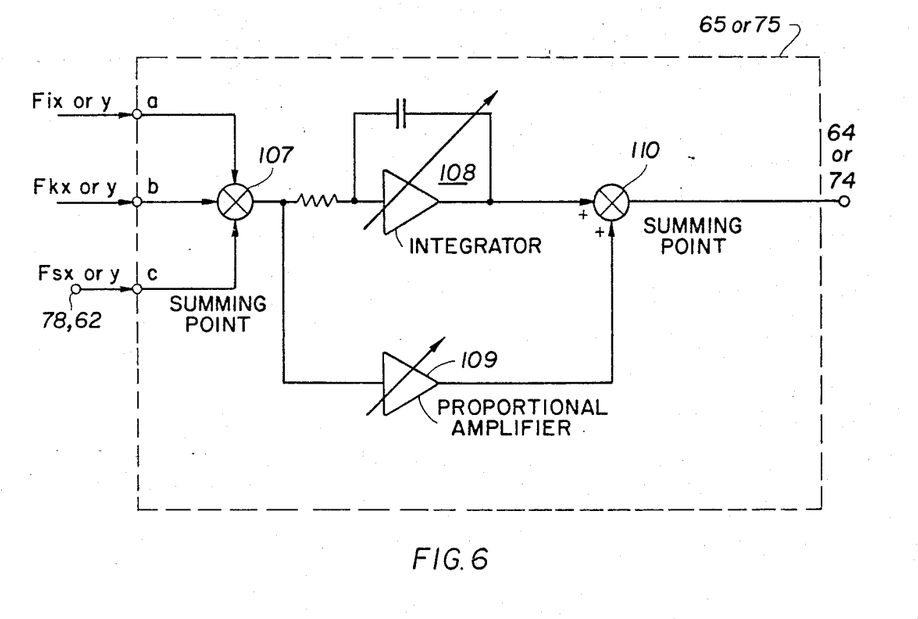
FIGS. 6 and 7 show details of control circuit members shown in block form in FIG. 1.

The time delay compensation circuits 102L, 102R are also known as such. These circuits are adjustable in order to take into account the time response characteristics of the hydraulic means especially of the servo valves 12, 22 and 32. These delay compensation circuits are adjusted in such a manner that all three cylinders 10, 20 and 30 will respond simultaneously to a corrected control signal. FIG. 6 illustrates an example of the integrating control members 65 or 75. Both members are identical to each other. The input terminals "a," "b," "c" which can receive the signals F$ix$, F$kx$, and F$sx$ or F$iy$, and F$sy$ respectively, are connected to a summing network 107 which is connected with its output to a conventional integrating network 108 and to a proportional amplifier 109. The outputs of the integrator 108 and of the amplifier 109 are connected to a further summing network 110 which in turn is connected to the outputs 64 or 74 as has been described above with reference to FIG. 1.

Figure 7:
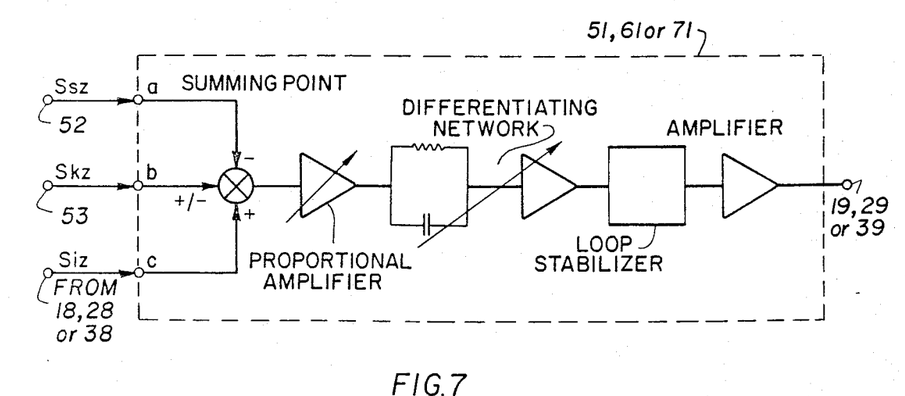

FIG. 7 illustrates an example of the control members 51 or 61 or 71 which include the arrangement of elements as shown in the figure and which as such are conventional. These control members operate as proportional differentiating networks.

It is to be understood that the invention is not limited to the illustrated example embodiments but it is also applicable to other testing equipment, for example for testing axles subject to steering wherein the load application means are rigidly secured to the testing frame or in which the load application means may follow the steering movement. Thus, it is to be understood that it is intended to cover all modifications and equivalents within the scope of the appended claims.

What is claimed is:

1. An apparatus for testing a sample having movable components by applying loads to said sample at a load application point whereby the loads vary with respect to time and which loads are effective in different directions, comprising first load applying means and second load applying means each arranged for applying respective loads to said sample, separate control means operatively connected to the respective first and second load applying means, first and second control value input means connected to said control means of the respective first and second load applying means, function generator means having a predetermined characteristic for taking into account displacement curves of said load application point which displacement curves are determined by the geometric configuration of said sample, and input terminal means as well as output terminal means, circuit means for connecting said first control value input means to said function generator means input terminal means and further circuit means for connecting said function generator means output terminal means to said control means of said second load applying means, whereby a displacement dependent correction signal is supplied by said function generator means to said control means of the second load applying means in response to a control value derived from said first control value input means.

2. The apparatus according to claim 1, wherein said first and second load applying means comprise respective piston cylinder means including piston rods arranged to be effective substantially at right angles relative to each other and on a common force application point of said sample.

3. The apparatus according to claim 2, further comprising lever means journaled to said sample, said lever means having an effective length substantially corresponding to the diameter of a wheel carried by an axle, and means for connecting said piston rods to said lever means at a point corresponding to a point of contact between said wheel and the road.

4. The apparatus according to claim 1, comprising means providing rated values representing rated displacements and rated forces wherein one of said control value input means comprise input terminal means for receiving rates values representing a rated displacement of the respective load applying means and further input terminal means for receiving rated values representing a rated force to be applied by the respective load applying means.

5. The apparatus according to claim 1, wherein said one of said control value input means comprise transducer means arranged to sensing the displacement of the respective load applying means to provide actual displacement representing values of the respective load applying means, sensing means for ascertaining actual force representing values of the respective load applying means, and means applying said actual displacement representing values and actual force representing means to the respective control means.

6. The apparatus according to claim 1 for testing a motor vehicle axle, wherein said first load applying means comprises a first hydraulic piston cylinder means including a respective load applying piston rod which is effective vertically to simulate road shocks, said second load applying means comprises a second hydraulic piston cylinder means including a second load applying piston rod which is effective substantially horizontally and in a direction extending substantially in parallel to said axle to apply lateral forces, and a third hydraulic piston cylinder means including a third piston rod which is effective substantially horizontally and substantially perpendicularly relative to said first and second piston rod to apply acceleration forces and braking forces, said control value input means comprising a rated force input terminal and a rated displacement input terminal as well as displacement sensing means and force sensing means for said control means, a force differentiating and integrating circuit means having three inputs and an output, a displacement differentiating and integrating circuit means also having three inputs and an output, first switching means for alternately connecting one of said three inputs of the displacement differentiating and integrating circuit means to said first mentioned output and to said rated displacement input terminal, said output terminal means of said function generator means comprising a plurality of output terminals, second switching means for alternately connecting another of said inputs of the displacement differentiating and integrating circuit means to different ones of said output terminals of said function generator means, means for connecting the third input of the displacement differentiating and integrating means to said displacement sensing means, means for connecting said force sensing means to one of the inputs of said force differentiating and integrating circuit means, means for connecting said rated force input terminal to another of said inputs of the force differentiating and integrating circuit means, means for connecting the third input terminal of said force differentiating and integrating circuit means to one of said output terminals of said function generator means, braking signal input means, means for connecting said braking signal input means to said first and second switching means for controlling said first and second switching means in response to the application of a braking signal, and means for connecting said control means of the third hydraulic piston cylinder means to the output of said displacement differentiating and integrating circuit means whereby said third hydraulic piston cylinder means is displacement controlled when said first and second switching means are in one position and whereby said third hydraulic piston cylinder means is force controlled when said first and second switching means are in another position in response to the presence of a braking signal at the braking signal input means.

7. The apparatus according to claim 6, wherein said piston rods are effective on a common load application point spaced from said axle, means for connecting said common load application point to said axle, said third piston rod which applies acceleration and braking forces to said common point, maintaining said point vertically below said axle in response to a rated displacement value applied to said rated displacement input terminal whereby said third piston cylinder means is controlled in response to displacement.

8. The apparatus according to claim 7, comprising further differentiating and integrating circuit means also including a respective plurality of inputs and an output connected to one input of said first mentioned differentiating and integrating circuit means, said function generator means comprising means for computing force correction values from said rated and actual displacement representing values as a function of the geometric dimensions of said sample, means for supplying said force correction values from respective ones of said plurality of said function generator output terminals to respective inputs of said further differentiating and integrating circuit means, and means for also supplying said rated and actual displacement representing values to respective ones of said further differentiating and integrating circuit means.

9. The apparatus according to claim 6, wherein said piston rods are effective on a common load application point spaced from said axle, means for connecting said common load application point to said axle, said third piston rod which applies acceleration and braking forces to said common point maintaining said point spaced from the vertical extending through said axle and below said axle in response to a force value applied to said force differentiating and integrating circuit means, whereby said third piston cylinder means is force controlled.

10. The apparatus according to claim 1, wherein said control means comprise differentiating and integrating circuit means including a plurality of inputs and an output as well as a control member for the respective load applying means, means for connecting said output to said control member, said control value input means comprising a rated displacement input terminal and actual displacement sensing means, said input terminal means and output terminal means comprising a plurality of input terminals and a plurality of output terminals respectively, means for connecting said rated displacement input terminal and said actual displacement sensing means to respective ones of said plurality of inputs of the differentiating and integrating circuit means and to respective ones of said plurality of input terminals of said function generator means for computing a displacement correction value from rated and actual displacement representing values dependent on the geometric dimensions of said sample, and means for connecting one of said output terminals of said function generator means also to a respective input of said differentiating and integrating circuit means whereby said displacement correcting value is applied to said last mentioned input.

11. The apparatus according to claim 1, wherein loads are applied to at least two points of a test sample, said apparatus further comprising means operatively connected to said computer means for supplying to said function generator means displacement representing values for each of said two points, said function generator means comprising means for calculating correction values as a function of coupling factors representing the mutual influence between said two load application points and in response to said displacement representing values.

12. The apparatus according to claim 1, comprising brake means coupled to said sample, means for actuating said brake means wherein said function generator means comprise storage means for storing displacement values in response to the actuation of said brake means, and means for calculating correction values as a function of displacement curves of said load application point whereby said curves are determined by said stored displacement values.

13. The apparatus according to claim 1, wherein said sample is a vehicle axle, said apparatus further comprising lever means, and means for operatively connecting one end of said lever means to said axle while the other end of said lever means constitutes said load application point whereby torque moments may be applied to said axle through said lever means.

14. The apparatus according to claim 13, wherein said connecting means comprise means for rotatably securing one end of said lever means to said axle whereby the lever is rotatable about said axle.

15. The apparatus according to claim 13, wherein said connecting means comprise means for blocking rotation between said lever and said axle.

* * * * *